US006553980B1

(12) United States Patent
Nally et al.

(10) Patent No.: US 6,553,980 B1
(45) Date of Patent: Apr. 29, 2003

(54) CENTER FEED OF AIR FOR AIR ASSIST FUEL INJECTOR

(75) Inventors: Debora Nally, Williamsburg, VA (US); Henry C. Dozier, Troy, MI (US)

(73) Assignee: Siemens Canada Limited, Tilbury (CA)

( * ) Notice: Subject to any disclaimer, the term of this patent is extended or adjusted under 35 U.S.C. 154(b) by 0 days.

(21) Appl. No.: 09/369,471

(22) Filed: Aug. 6, 1999

(51) Int. Cl.[7] .......... B23P 15/00
(52) U.S. Cl. .......... 123/585; 123/531
(58) Field of Search .......... 123/585, 587, 123/184.25, 184.26, 184.35, 184.36, 184.48, 184.49, 471, 531, 533

(56) References Cited

U.S. PATENT DOCUMENTS 2,833,260 A * 5/1958 Dolza et al. .......... 123/471
2,893,365 A * 7/1959 Haefner .......... 123/471
3,788,287 A 1/1974 Falen et al.
4,235,210 A * 11/1980 Sumiyoshi et al. .......... 123/471
4,289,104 A * 9/1981 Takada et al. .......... 123/471
5,209,191 A 5/1993 Kopec
5,406,913 A * 4/1995 Rutschmann .......... 123/184.36
5,441,032 A * 8/1995 Ikuta et al. .......... 123/585
5,623,904 A * 4/1997 Matsumoto .......... 123/585
5,657,733 A * 8/1997 Dozier et al. .......... 123/470
5,738,077 A * 4/1998 Kim .......... 123/585
5,785,251 A * 7/1998 Wood et al. .......... 239/417.3
5,797,381 A * 8/1998 Yoshioka et al. .......... 123/585
5,839,417 A * 11/1998 Kwiatkowski et al. .......... 123/585
5,873,354 A * 2/1999 Krohn et al. .......... 123/585
6,178,632 B1 * 1/2001 Worrel et al. .......... 29/888.46
6,371,387 B1 * 4/2002 Nally et al. .......... 239/408

FOREIGN PATENT DOCUMENTS

JP 403000926 * 1/1991 .......... 123/184.26
JP 404022712 * 1/1992 .......... 123/184.26

* cited by examiner

*Primary Examiner*—Noah P. Kamen
*Assistant Examiner*—Jason Benton

(57) ABSTRACT

A manifold for a fuel injected engine has several fuel injectors that are connected to a common air assist passageway for each bank of cylinders. This passageway is preferably supplied with assist air from a central location, between two of the fuel injector pockets that intersect the air assist passageway in each bank of cylinders. This air assist passageway may be formed integral with a manifold, or may be separately formed together with the injector pockets as an air assist rail. The air assist passageway preferably intersects the center line of the fuel injector pockets and is formed by inserting pins that define the interior surface of the passageway into a mold cavity to intersect and pass through bosses that define the fuel injector pockets.

21 Claims, 8 Drawing Sheets

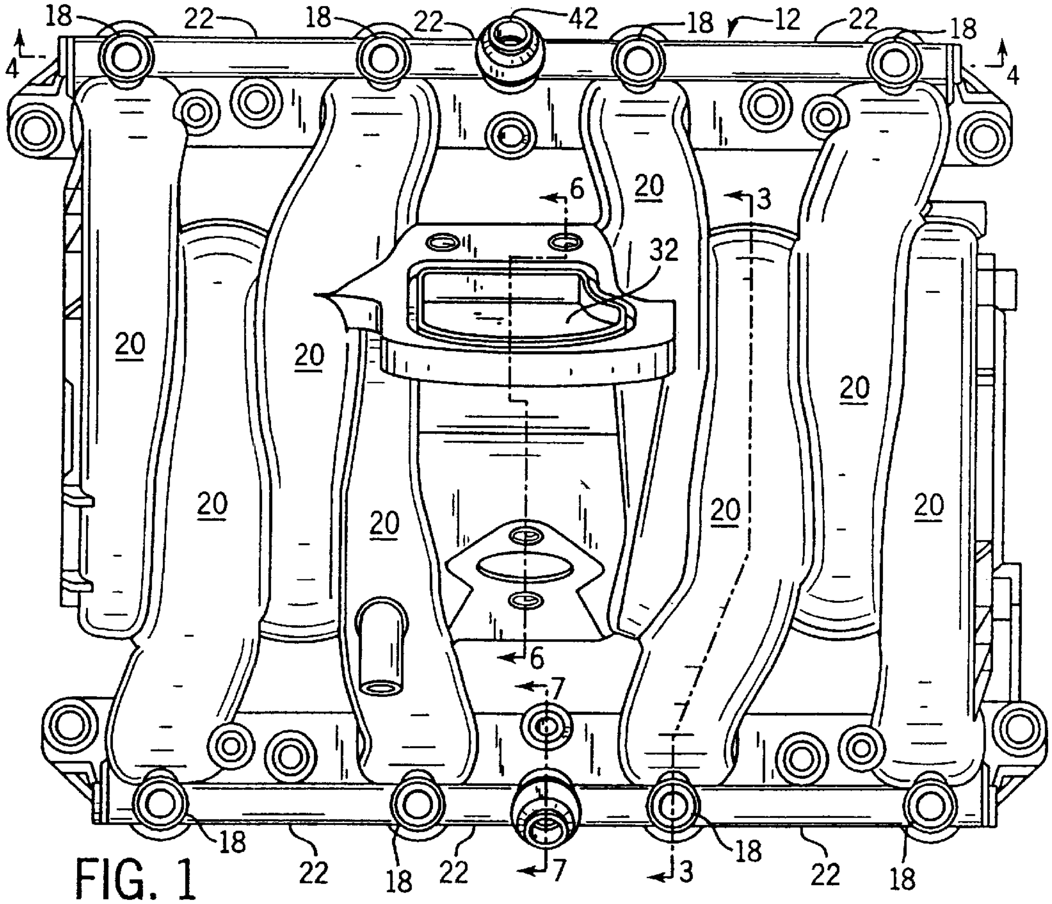
FIG. 1
FIG. 2
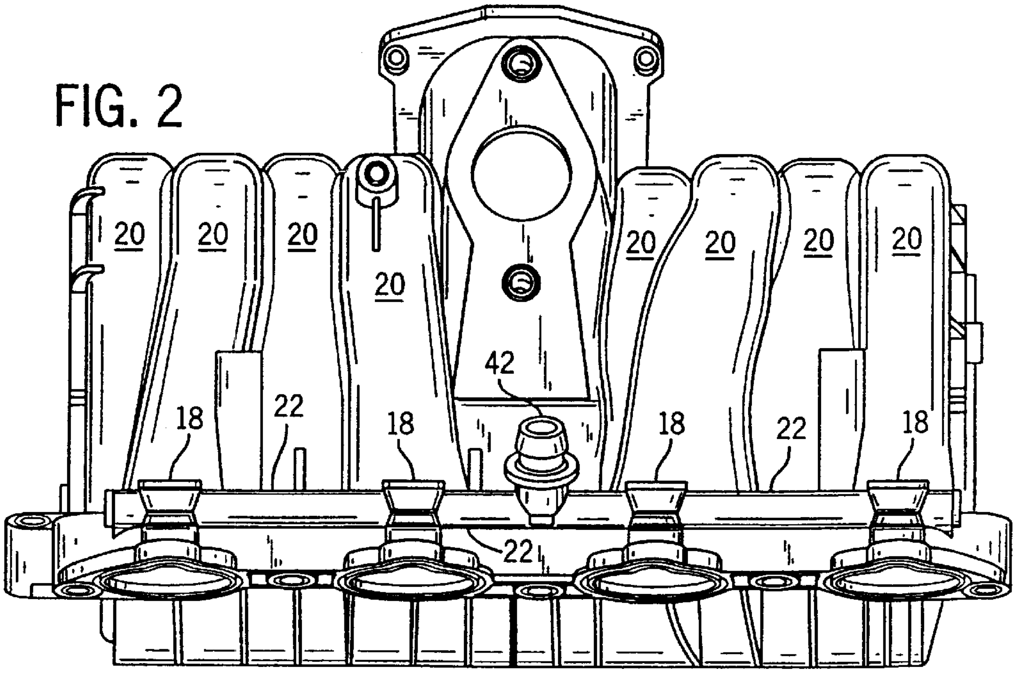

FIG. 3
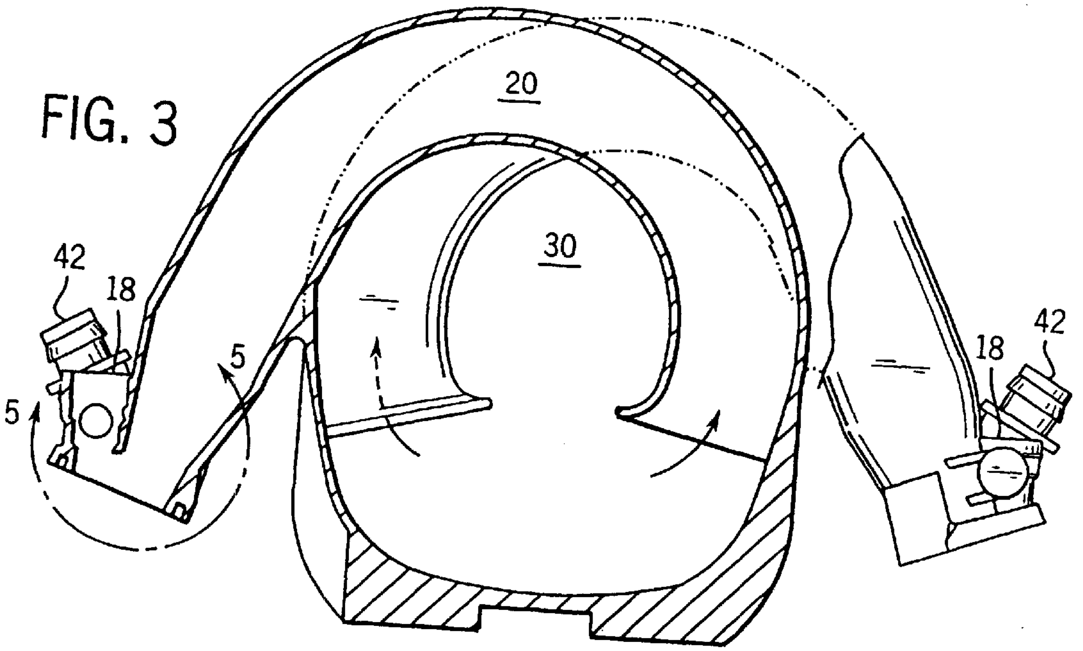
FIG. 4
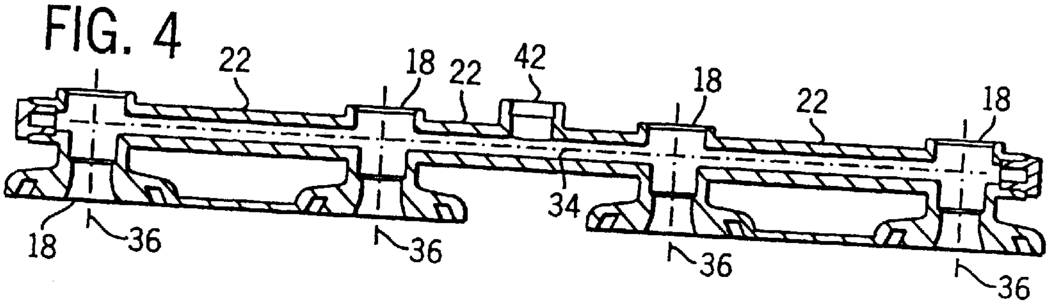
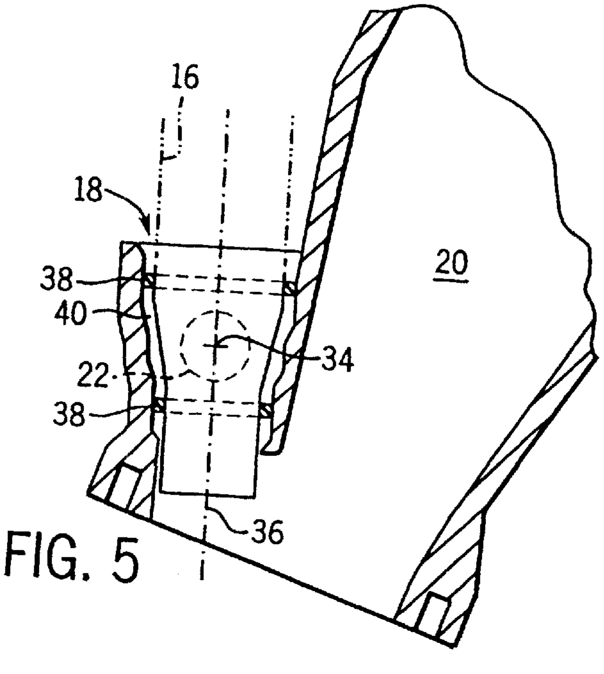
FIG. 5

CENTER FEED OF AIR FOR AIR ASSIST FUEL INJECTOR

FIELD OF THE INVENTION

This application is an application for patent which relates to air intake systems for internal combustion engines, particularly internal combustion engines for automobiles. More particularly, it relates to intake manifolds and air assist rails and methods for making the same.

BACKGROUND OF THE INVENTION

Fuel injectors are often designed to use air under pressure to assist the atomization of fuel by the injectors. Since each injector in an engine requires air assist, each injector is connected to a supply of pressurized air.

Traditionally, since the injectors are in predetermined positions with respect to each other, the air is supplied to a bank of injectors by an external pod or rail. This pod is rigid and is attached to a row of injectors along a single bank. Thus, for in-line engines, there would be a single pod that extends the length of the engine connecting to all the cylinders. For engines with two banks of cylinders, such as "V"-type engines or horizontally opposed pancake engines, two pods are provided where each pod is connected to the injectors for a single bank of cylinders. In another arrangement, the air assist passageway is not provided by an external pod, but is formed as a passageway internal to the intake manifold.

While the external pod requires additional piping and connections for each of the injectors, it also permits a passageway with optimum air pressure and air distribution. It also permits the intake manifold and cylinder head geometry to be kept simple.

Air assist passageways formed internal to the manifold are significantly constrained in their design. For example, they are either molded using pins, or are formed by gun-drilling the manifold after it is molded. As a result, the air assist passageways typically have a circular cross section with a relatively constant cross sectional area, and a straight longitudinal axis. Their diameter is typically limited to fit between and around the injector pockets and the air induction ports for each cylinder. The longitudinal axes of the air assist passageways formed in the manifold are typically offset to one side of the fuel injector pockets such that they intersect the air injector pockets on one side.

These constraints cause several problems. First, there are significant air assist pressure drops from injector to injector as the assist air travels the length of the air assist passageway. Second, when the injectors operate, they generate pressure pulses that travel down the air assist passageways. Depending upon the geometry of the air assist passageways, these pressure pulses may cause injectors to be starved for assist air, or alternatively have too much assist air applied to the injectors. This is commonly called "cross-talk" between injectors and negatively affects the atomization of the fuel. In addition, fuel from an upstream injector can be introduced into the air assist passageways and can be transmitted to neighboring air injectors.

The problems are compounded by supplying assist air to an end of the internal air assist passageway. Typically, a connection is provided on one end of the air assist passageway into which the assist air is supplied. Thus, for example, the air assist passageways on a V-8 engine (having two banks of four cylinders) would be fed from an air line connected to an end of the air assist passageway. To reach the fuel injector at the far end of the engine, the passageway would have to pass three fuel injectors, all of them introducing pressure pulsations into the system that would affect the end cylinder. In a straight six-cylinder engine, the air assist passageway would pass five fuel injectors before reaching the last fuel injector in the bank of cylinders. Five fuel injectors introduce their pressure pulsations into the air assist passageway that would affect that last fuel injector.

What is needed therefore is an improved method and apparatus for supplying assist air to an engine having a plurality of fuel injectors. It is an object of this invention to provide such an apparatus and method.

SUMMARY OF THE PRESENT INVENTION

In accordance with a first embodiment, an air intake system for an internal combustion engine having at least one bank of cylinders adjacent to each other is provided, including a first plurality of air induction passageways couplable to the at least one bank of cylinders for conducting combustion air to the cylinders in the first bank of cylinders, a first plurality of fuel injector pockets, each fluidly coupled with one of the first plurality of air induction passageways, and a first air assist passageway fluidly coupled with the first plurality of fuel injector pockets to communicate assist air to each of the fuel injector pockets, wherein the first air assist passageway has a first assist air feed port for receiving assist air and the first assist air port is disposed between at least two of the first plurality of fuel injector pockets.

The air intake system may also include a second plurality of air induction passageways couplable to at least another bank of cylinders of the internal combustion engine for conducting combustion air to the cylinders in the second bank of cylinders, a second plurality of fuel injector pockets, each fluidly coupled with one of the second plurality of air induction passageways, and a second air assist passageway fluidly coupled with the first plurality of fuel injector pockets to communicate assist air to each of the fuel injector pockets, wherein the air assist passageway has a second assist air feed port for receiving assist air and the second assist air port is disposed between at least two of the second plurality of fuel injector pockets.

The first and second pluralities of air induction passageways may each include at least three passageways, each of the at least three passageways being couplable to a corresponding cylinder of the first and second banks of cylinders, respectively.

The first and second pluralities of air induction passageways may each include at least four passageways, each of the at least four passageways being couplable to a corresponding cylinder of the first and second banks of cylinders, respectively.

The first plurality of air induction passageways may include at least four passageways, each of the at least four passageways being couplable to a corresponding cylinder of the first bank of cylinders.

The first plurality of injector pockets, the first plurality of air induction passageways, the first air assist passageway and the first assist air feed port may be formed in an intake manifold.

The first plurality of fuel injector pockets may have central longitudinal axes, and those axes may be intersected by the first air assist passageway.

The first air assist passageway may have a longitudinal axis, and that axis may substantially intersect the first longitudinal axes of the first plurality of fuel injector pockets.

The first air assist passageway may intersect the plurality of fuel injector pockets between two circumferential seats on each of the plurality of fuel injector pockets, and the two circumferential seats may be engageable with two flexible seals disposable between the two circumferential seats and a fuel injector.

The two flexible seals may be O-rings. The manifold may include a plenum, and may be made of fiber-reinforced plastic.

Other principal features and advantages of the invention will become apparent to those skilled in the art upon review of the following drawings, the detailed description and the appended claims.

BRIEF DESCRIPTION OF THE DRAWINGS

FIG. 1 is a top view of an air intake manifold for a V-8 engine having two banks of cylinders, each having an air assist passageway feeding four injectors and a center feed of the air assist passageway;

FIG. 2 is a side view of the air intake manifold of FIG. 1, showing the air assist passageway of a single bank of cylinders;

FIG. 3 is a cross-sectional view of the manifold of FIG. 1 taken at Section 3—3 in FIG. 1 and showing the curvature of the internal plenum;

FIG. 4 is a cross sectional view of the manifold of FIG. 1 taken at Section 4—4 in FIG. 1 and showing the air assist passageway and the injector pockets for one bank of cylinders in cross section;

FIG. 5 is a partial cross-sectional view of the manifold of FIG. 3 taken at Section 5—5 and showing details of the injector pocket and the intersection of the air assist passageway with the center line of the injector pockets;

Figure 6:
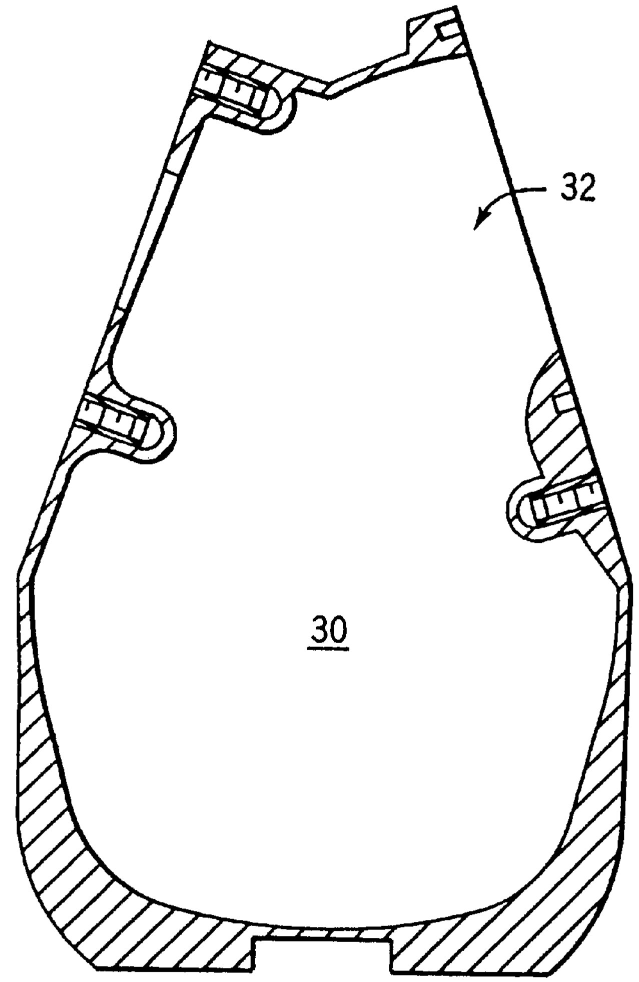
FIG. 6 is a cross-sectional view of the manifold of FIG. 1 taken at Section 6—6 and showing the combustion air entrance to the plenum of the manifold.
Figure 7:
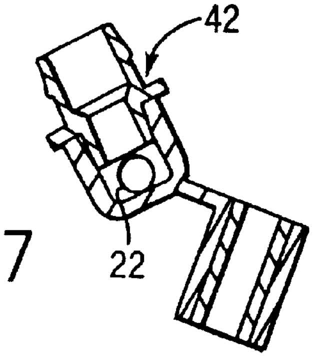
FIG. 7 is a cross-sectional view of the manifold of FIG. 1 at Section 7—7 and showing the center air assist feed into the air assist passageway.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1, an intake manifold 12 for a V-8 engine is shown. Fuel injectors are fitted into fuel injector pockets 18 formed in manifold 12 and communicate with induction air passageways 20 that supply combustion air to the engine 10. Each bank of the manifold has an air assist passageway 22 that extends the length of each bank, and is in fluid communication with each of the injector pockets in their respective banks of cylinders. An air assist port 42 is located between the inner two cylinders of each bank and is supplied with assist air under pressure.

The induction air passageways 20 supply substantially all the combustion air to their respective cylinders. They extend from a central portion or plenum 30 of intake manifold 12. The plenum receives substantially all the combustion air required by the engine through an opening 32, and serves to distribute it to each of the induction air passageways 20, which collectively supply substantially all the combustion air to the engine in equal amounts. The air induction passageways have substantially the same cross-sectional area and each conducts substantially the same amount of combustion air.

Since manifold 12 is designed for a V-8 engine, there are two sets of induction air passageways 20, one for each bank of cylinders, each set having four passageways, and each passageway being associated with one of the cylinders in that bank. FIG. 5 illustrates the arrangement of a typical set of injector pockets together with its associated air assist passageway. Each set of induction air passageways has an associated air assist passageway 22 integrally formed in the manifold that is in fluid communication with all the fuel injectors 16 of that set. While FIG. 5 shows only a single fuel injector 16 in its associated fuel injector pocket 18 it is understood that each of the injector pockets described herein will be similarly equipped.

The air assist passageway for each set of induction air passageways is circular, and has a longitudinal axis 34 that extends through and intersects the fuel injector pockets 18 in each set. The air assist passageway and its longitudinal axis preferably intersects the fuel injector pockets at a right angle to the longitudinal central axis 36 of the fuel injector pockets to provide for better distribution of the assist air. As best shown in FIG. 5, which shows air assist passageway 22 end-on, the air assist passageway preferably intersects longitudinal axis 36 of the fuel injector pockets 18. Preferably, and as shown here, longitudinal axis 34 substantially intersects longitudinal central axis 36 of the fuel injector pockets. Indeed the intersection of the air assist passageways and the fuel injector pockets is preferably so complete that a separate and distinct entrance opening an exit opening of the air assist passageway into and out of the fuel injector pocket is formed. The fuel injector pockets in each bank are preferably arranged in a substantially straight line, and hence the air assist passageway 22 (which is preferably straight as well) intersects each fuel injector pocket at the same location within each pocket.

Fuel injectors 16 are supported in pockets 18 on two flexible seals, shown here as "O"-rings 38, that define air assist chambers 40 between the outer surface of the fuel injectors 16 and the inner surface of fuel injector pockets 18. These seals both support the fuel injector and prevent the pressurized assist air from escaping the fuel injector pocket. The air assist passageways enter into and exit the fuel injector pockets in the air assist chambers 40 at a point between the upper and lower flexible seals 38. In this manner, the assist air is held within the injector pockets and is prevented from leaking out.

Air is introduced into the air assist passageway of the FIG. 1 manifold at a point between the two inner fuel injectors on each bank. As best shown in FIGS. 1 and 4 an air assist port 42 is provided in the air assist passageway through which assist air under pressure is supplied to the air assist passageway. This port may be connected to an assist air line by any of a variety of conventional means well known to those skilled in the art. As shown, a single port is provided through which air is introduced. Once introduced into air assist port 42, the air is diverted in two directions, following both a leftward and a rightward path, each path directing the assist air toward a pair of associated cylinders in the bank.

While the air assist port 42 of the preferred embodiment is disposed between two pairs of injector pockets and thus feeds equal numbers of cylinders on each path, it can be disposed between any two adjacent injector pockets and still provide substantial advantages over the prior art arrangement in which assist air was supplied only to one end of the air assist passageway.

Figure 11:
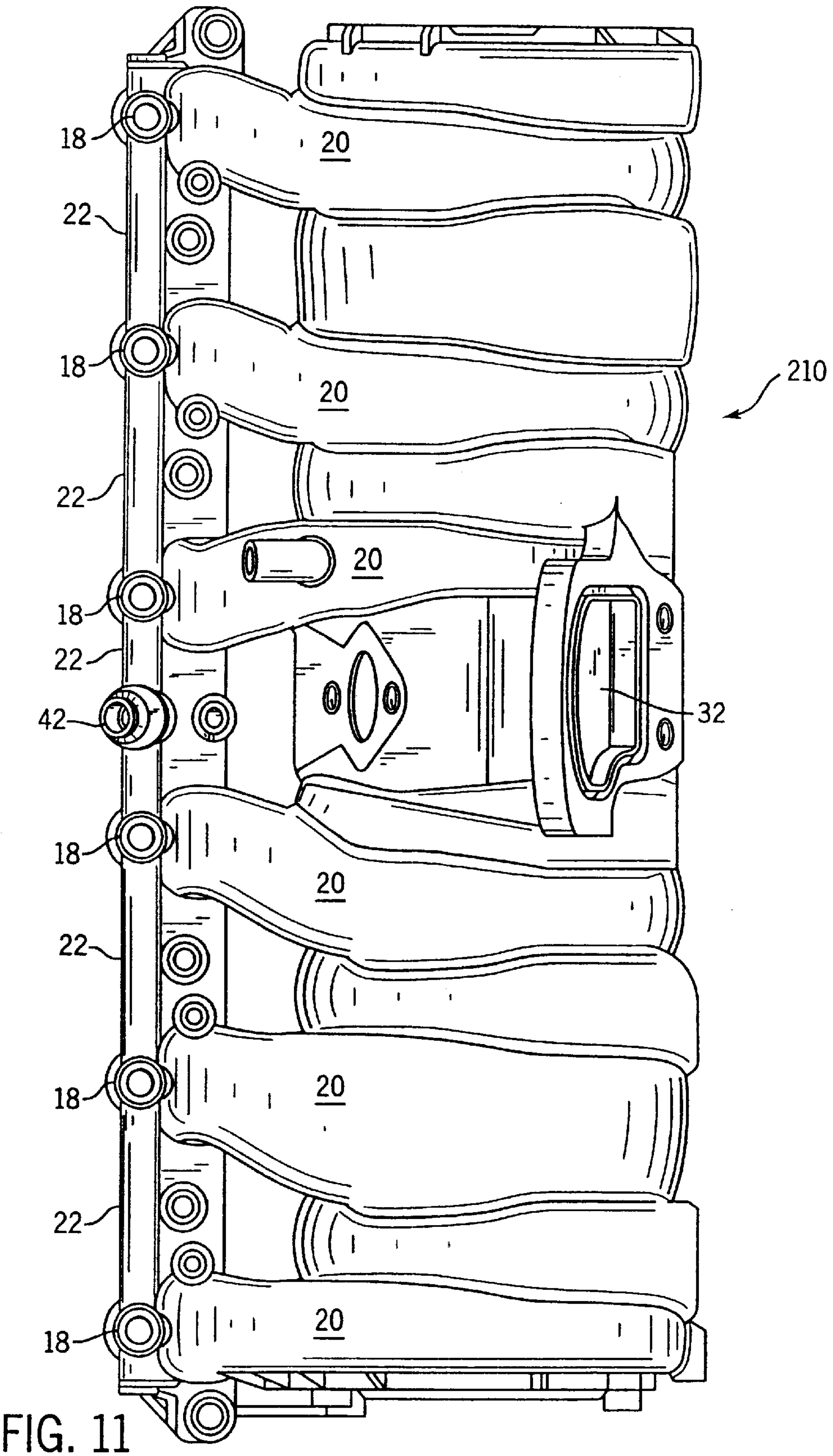
FIG. 11 is a top view of a manifold of a straight six cylinder engine with a single bank of cylinders and an integral air assist passageway integrally formed with the manifold in the same manner as described in accordance with the preceding figures.

For example, FIG. 11 shows an intake manifold 210 for a straight 6 cylinder engine having a single air assist passageway that feeds all six injector pockets for each of the cylinders of the engine. In this case, the air assist port is disposed between two groups of three cylinders (and hence between two groups of three induction air passageways and their corresponding injector pockets) in the air assist passageway. In all other respects, other than the arrangement of cylinders in a single bank, the system is the same as that described herein for the manifold of FIG. 1.

Figure 12:
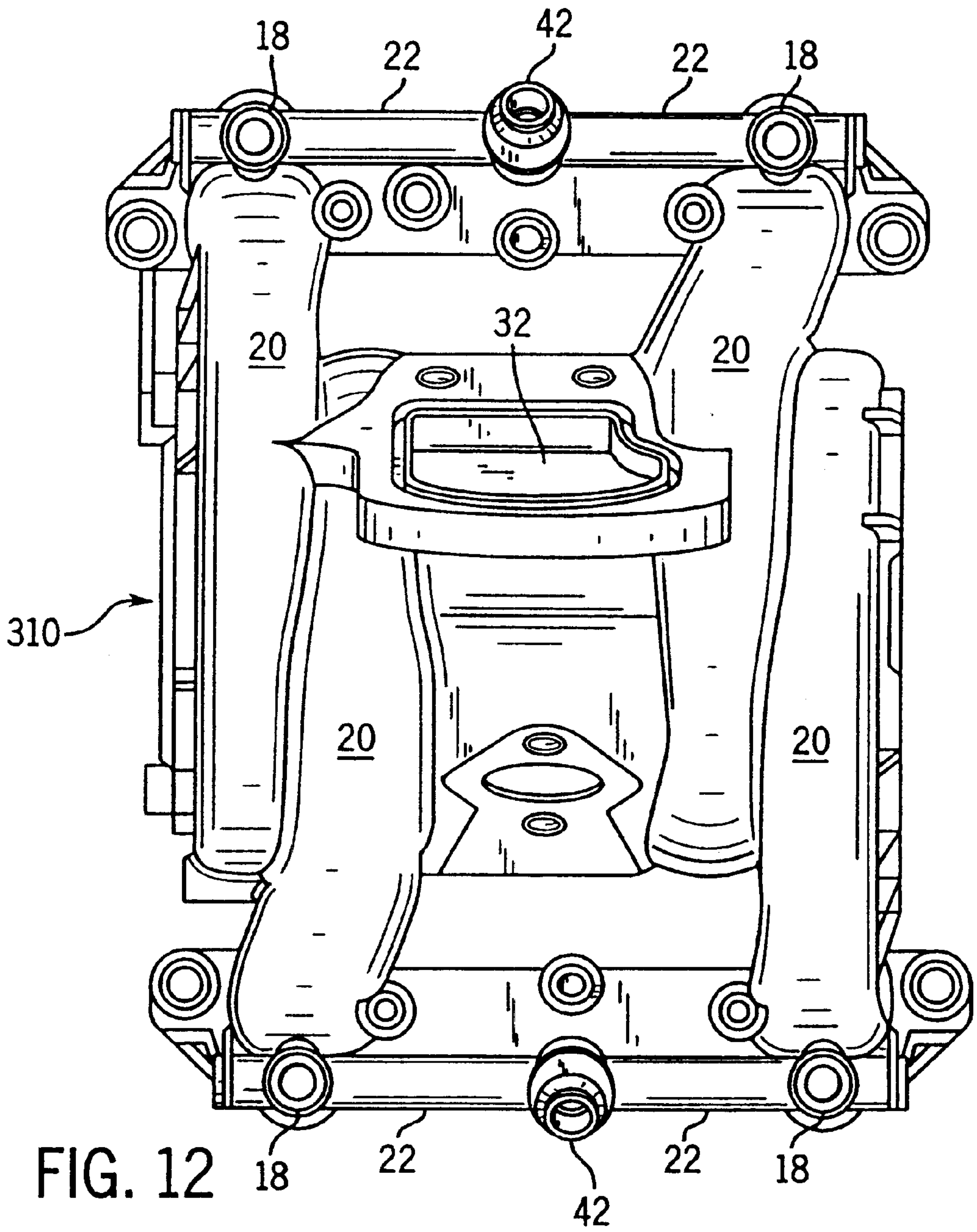
FIG. 12 is a top view of a manifold of a V-4 engine with two banks of cylinders each having an integral air assist passageway integrally formed with the manifold in the same manner as described in accordance with the preceding figures.

As a further example, FIG. 12 shows an intake manifold 310 for a V-4 engine having two banks of cylinders, each bank having an air assist passageway to feed the two cylinders in that bank. In this case, the air assist port is disposed between each of the two cylinders (and hence between each of two induction air passageways and their associated injector pockets) in each bank. In all other respects, other than the reduction in the number of cylinders, induction air passageways and associated injectors in each bank, the system is the same as that described herein for the manifold of FIG. 1.

Figure 13:
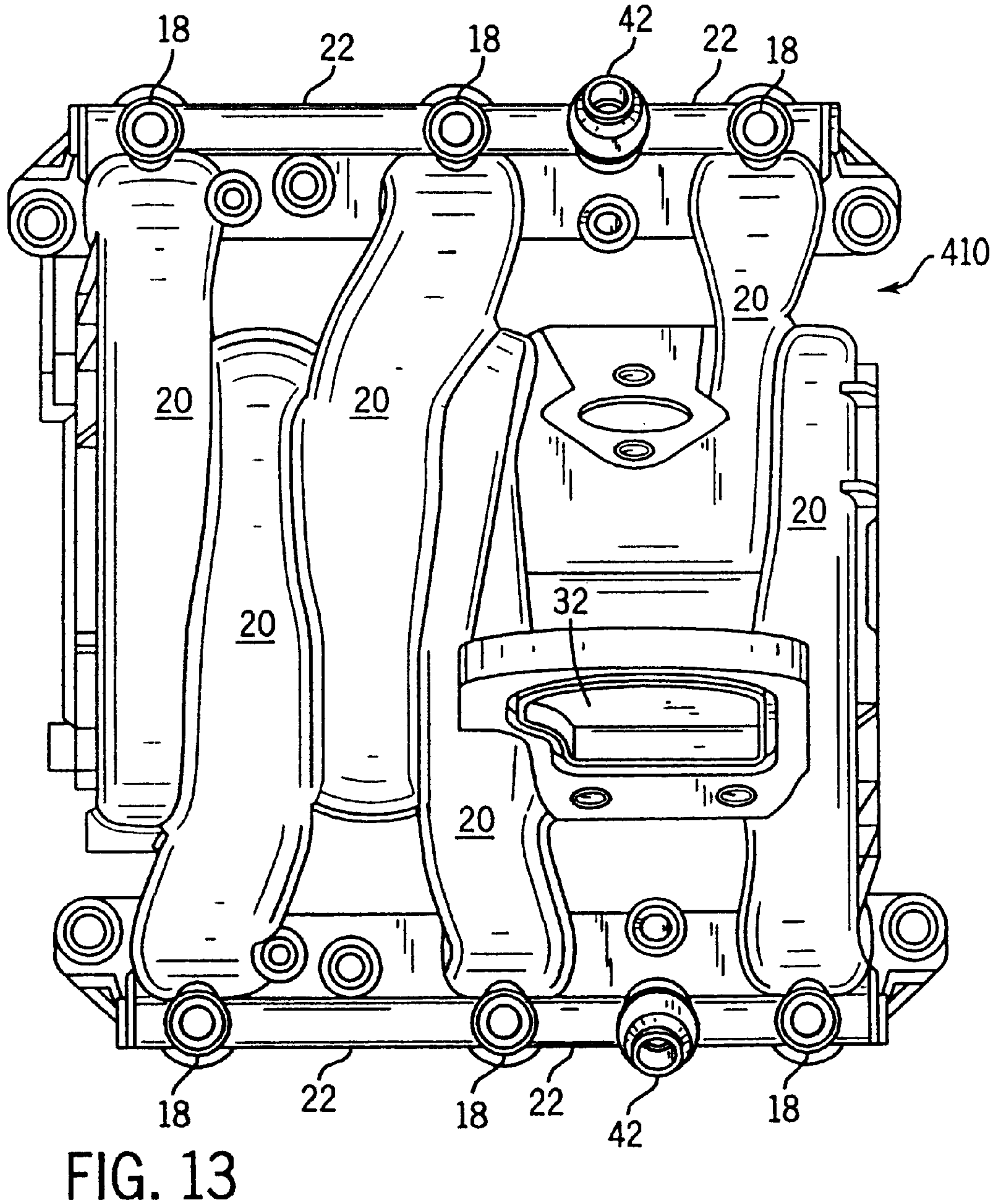
FIG. 13 is a top view of a manifold of a V-6 engine with two banks of cylinders and an integral air assist passageway integrally formed with the manifold in the same manner as described in accordance with the preceding figures.

As yet another example, FIG. 13 shows an intake manifold 410 for a V-6 engine having two banks of cylinders, each bank having an air assist passageway to feed the three cylinders in that bank. In this case, the air assist port is disposed between two of the three cylinders in each bank (and hence between two induction air passageways and their associated injector pockets), with one cylinder (and passageway and associated pocket) on one side of the air assist port and two cylinders (and their associated induction air passageways and associated injectors) on the other side of the air assist port. In all other respects, other than the reduction in the number of cylinders, induction air passageways and associated injector pockets in each bank, the system is the same as that described herein for the manifold of FIG. 1.

Figure 8:
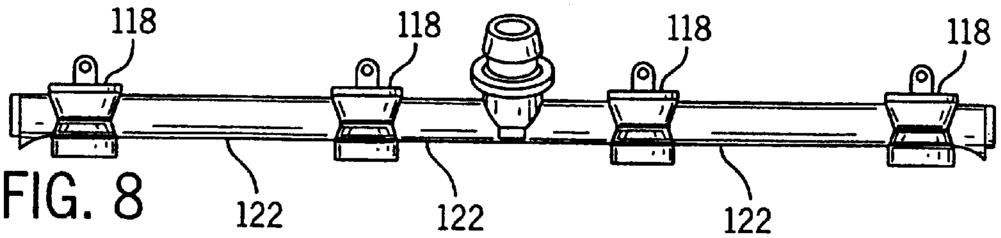
FIG. 8 shown an alternative arrangement of the air assist passageway of the FIG. 1 manifold formed as a separate unit and not integral with the manifold of FIG. 1.
Figure 9:
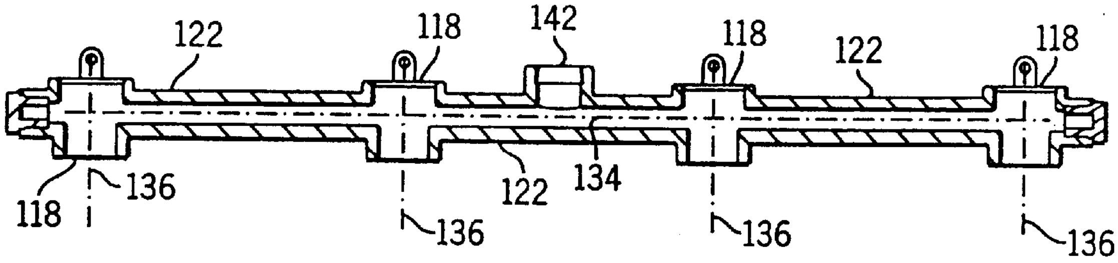
FIG. 9 is a cross-sectional view of the separate air assist passageway of FIG. 8 wherein the cutting plane is defined by the center lines of the injector pockets and the center line of the air assist line.
Figure 10:
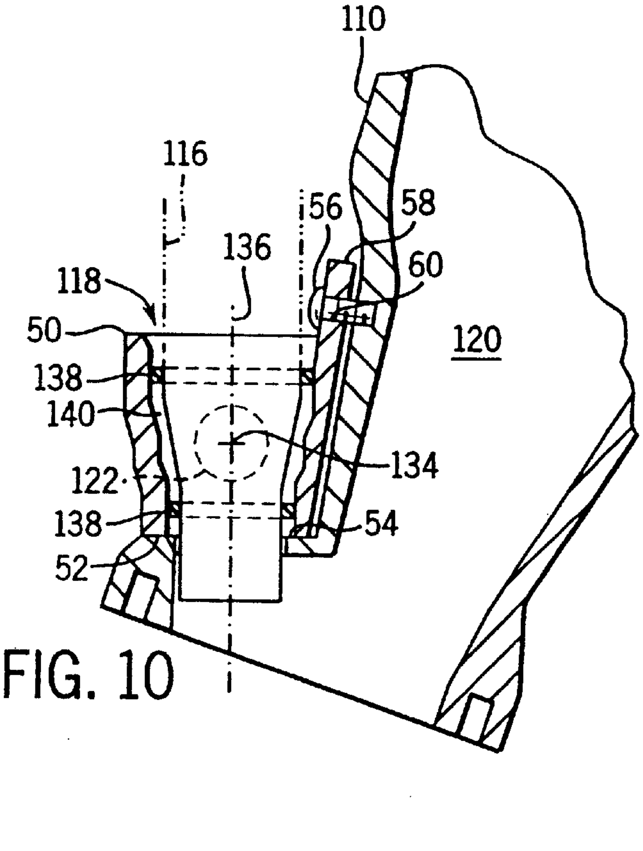
FIG. 10 is a cross section of the separate air assist passageway of FIGS. 8–9 taken at Section 10—10 in FIG. 9 and showing a partial cross section of the manifold in FIG. 1 but having a separate air assist passageway and the method of attaching the separate air assist passageway to the manifold.

While the air assist passageways and injector pockets are preferably formed integrally with the manifold as shown in the arrangements of FIGS. 1–7 and 11–13, they can be separately formed and attached to the manifold at a later date. This has the advantage of permitting the air assist passageway and the manifold to be made more precisely and positioned more accurately. In this arrangement, the air assist passageway and injector pockets would preferably be removably fastened to the intake manifold itself. FIGS. 8–10 illustrate such an arrangement.

FIGS. 8–10 illustrate an air assist rail for a manifold 110 similar to manifold 12, but having a separate air assist passageway formed as a separate air assist rail and removably attached to the manifold. In the preferred embodiment manifold 110 to which they are attached is the same in every respect to that of the FIG. 1 manifold 12, but does not have the integral air assist passageway 22 or integral injector pockets 18 as shown most clearly in FIG. 5. Instead, an air assist rail 50 with associated injector pockets 118 is separately formed and attached to the modified manifold 110 as best shown in FIG. 10. As with the example of manifold 12 of FIG. 1, manifold 110 is designed for a V-8 engine, and has two sets of induction air passageways 120, one for each bank of cylinders, each set having four passageways 120, and each passageway being associated with one of the cylinders in that bank. FIG. 9 illustrates the arrangement of a typical set of injector pockets together with its associated air assist passageway 122. Each set of induction air passageways 120 on each bank has an associated air assist rail 50 that is in fluid communication with all the fuel injectors 16 of that set. While FIG. 9 shows only a single fuel injector 16 in its associated fuel injector pocket 118 it is understood that each of the injector pockets described herein will be similarly equipped.

The air assist passageway 122 for each set of induction air passageways 120 is circular, and has a longitudinal axis 134 that extends through and intersects the fuel injector pockets 118 in each set. Each air assist passageway 122 and its longitudinal axis 134 preferably intersects the fuel injector pockets at a right angle to the longitudinal central axis 136 of its associated fuel injector pockets 118 to provide for better distribution of the assist air. As best shown in FIG. 9, which shows the air assist passageway 122 end-on, air assist passageway 122 preferably intersects longitudinal axis 136 of the fuel injector pockets 118. Preferably, and as shown here, longitudinal axis 134 substantially intersects longitudinal central axis 136 of the fuel injector pockets. Indeed, the intersection of the air assist passageways and the fuel injector pockets is preferably so complete that a separate and distinct entrance opening and exit opening of the air assist passageway into and out of the fuel injector pocket is formed. Fuel injector pockets 118 in each bank are preferably arranged in a substantially straight line, and hence their associated air assist passageway 122 (which is preferably straight as well) intersects each of its fuel injector pockets 118 at the same location within each pocket.

Fuel injectors 16 are supported in pockets 118 on two flexible seals, shown here as "O"-rings 138, that define air assist chambers 140 between the outer surface of the fuel injectors 16 and the inner surface of fuel injector pockets 118. These seals both support the fuel injector and prevent the pressurized assist air from escaping the fuel injector pocket. Air assist passageways 122 enter into and exit fuel injector pockets 118 in air assist chambers 140 at a point between the upper and lower flexible seals 138. In this manner, the assist air is held within the injector pockets and is prevented from leaking out.

Air is introduced into air assist passageway of the air assist rail 50 at a point between the two inner fuel injectors on each bank. As best shown in FIG. 9 an air assist port 142 (similarly formed and constructed in all respects to air assist port 42), is provided in air assist passageway 122. It is through this port that assist air under pressure is supplied to air assist passageway 122. This port may be connected to an assist air line by any of a variety of conventional means well known to those skilled in the art. As shown, a single port is provided through which air is introduced. Once introduced into air assist port 142, the air is diverted in two directions, following both a leftward and a rightward path, each path directing the assist air toward a pair of associated cylinders in the bank of cylinders associated with that air assist passageway.

Unlike the examples of FIGS. 1–7 and 11–13, the air assist rail is separable from the manifold. To provide an air tight seal with the manifold, each pocket 118 on the air assist rail has an associated circular sealing surface 52 extending from the bottom of injector pockets 118 that abuts a similarly circular opening 54 on manifold 110. A sealing material (not shown) such as sealing rings or gaskets may be disposed between each of these surfaces 52 and associated openings 54. Air assist rail 50 is fixed to manifold 110 using a plurality of fasteners, preferably removable screw-type fasteners, and most preferably (and as shown here) machine screws 56. In the preferred embodiment, each injector pocket is provided with an ear 58 that extends upward from the pocket and has an opening 60 through which the fastener is inserted. The fastener is screwed into manifold 110 as shown in FIG. 10, and air assist rail 50 is thereby fixed to manifold 110.

While air assist port 142 of the preferred embodiment is disposed between two pairs of injector pockets and thus feeds equal numbers of cylinders on each path, it can be disposed between any two adjacent injector pockets 118 and still provide substantial advantages over the prior art arrangement in which assist air was supplied only to one end of the air assist passageway.

As in the examples of FIGS. 11–13, which illustrate an air assist passageway formed integrally with a manifold, air assist rail 50 of FIGS. 8–10 may be used with a variety of engine arrangements, including a straight six engine, a V-4 engine, and a V-6 engine and is disposed in a similar location on the manifolds of these engines as the assist air passageways of FIGS. 11–13.

Figure 14:
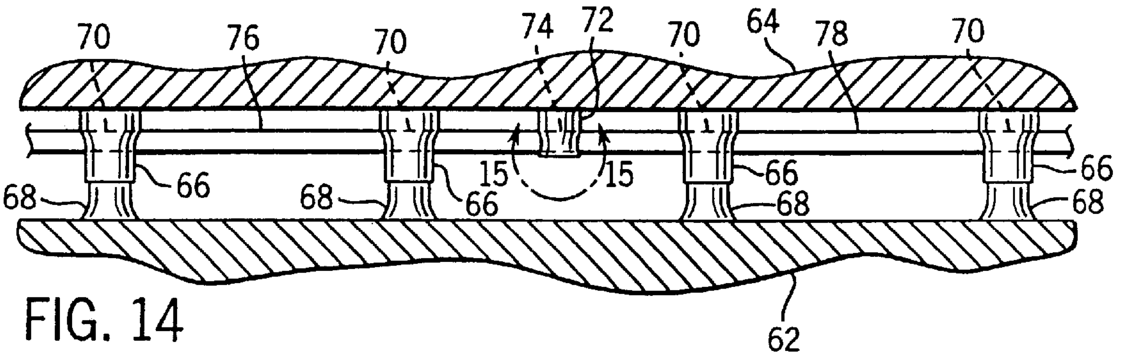
FIG. 14 is a partial cross-sectional view of a mold defining the air assist passageway and injector pockets for the manifold of FIG. 1 or the assist air rail of FIG. 8 showing the fuel injector pocket bosses and the air assist port boss extending from an upper mold portion that define the fuel injector pockets and the air assist port, respectively, and pins extending laterally through the bosses that define the air assist passageway connecting the bosses, where the portions of the upper and lower mold portions that define the outer surface of the air assist passageway and the injector pockets are removed for clarity to show the arrangement of the bosses and pins.
Figure 15:
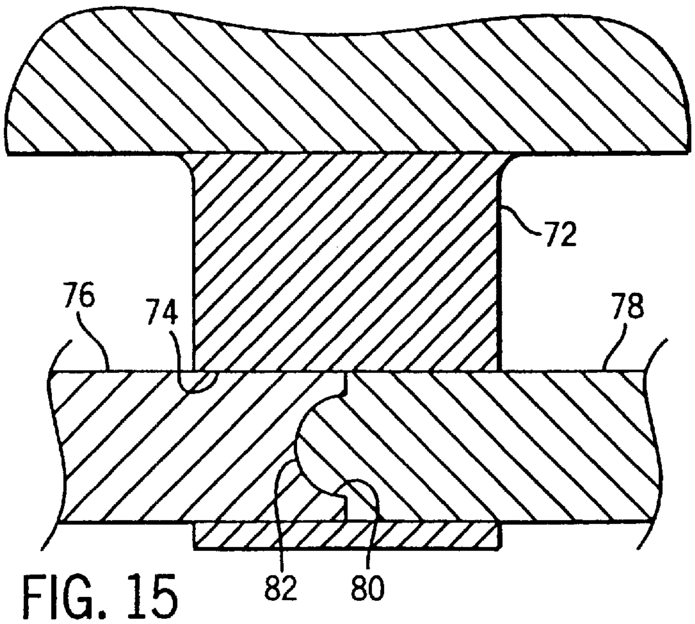
FIG. 15 is a cross sectional view of the mold arrangement of FIG. 14 taken at Section 15—15 and showing the air assist port boss and the air assist passageway pins in cross section and including details of a recess and protrusion on the pins that align them with respect to each other.

In all the foregoing embodiments, the air assist passageways and the fuel injector pockets are preferably formed in a single molding operation, whether they are formed as a part of the entire manifold 12, 210, 310 or 410, or whether they are formed as a separate air assist rail 50. FIGS. 14–15 illustrate the preferred arrangement. For clarity, the mass of the mold cavity that forms the outside surface of the air assist passageways and the fuel injector pockets has been removed, and only the salient parts—the bosses that form the fuel injector pockets and the pins that form the air assist passageways—are shown in detail. The rest of the mold forming the outer surface of manifold 12, 210, 310 or 410 (if formed integrally with the manifold) or the air assist rails 50 (if formed separate from the manifold) are configured in a conventional manner well known to those skilled in the art. The arrangement of mold, bosses and pins described below can be used to form the injector pockets and air assist passageways of either the unitary manifold (best shown in FIGS. 1, and 11–13), or the separate air assist rail 50 (best shown in FIG. 8).

A first injection mold portion 62 and a second injection mold portion 64 collectively define the outer surface of the injector pockets and the air assist passageways. First mold portion 62 forms a portion of the lower outer surface of the manifold 12, 210, 310 or 410, or air assist rail 50 if it is being formed separately. Second mold portion 64 forms the upper outer surface of the manifold 12, 210, 310 or 410, or air assist rail 50 if it is being formed separately. First and second mold portions 62 and 64 abut one another to collectively define the mold cavity that shapes the outer surface of the manifolds or fuel rail. Second mold portion 64 has a plurality of injector pocket bosses 66 extending into the mold cavity from an interior surface thereof to form an upper portion of the injector bosses. First mold portion also has a plurality of bosses 68 that abut bosses 66 to form a bottom portion of fuel injector pockets. Bosses 66, 68 substantially define the interior surface of the fuel injector pockets. Bosses 66, 68 are preferably arranged in a straight line and have parallel longitudinal axes, thus providing fuel injector pockets in the finished manifold or air assist rail that are parallel. Each boss 66 has a passageway 70 defined therethrough. These passageways are coaxial to thereby define a continuous and hollow cylindrical opening extending through all the bosses 66.

An additional air assist port boss 72 also extends into the mold cavity and has a passageway 74 extending therethrough that is coaxial with the passageways 70 extending through each of the bosses 66 that form the interior of the injector pockets. Thus, passageways 70 that pass through bosses 66 and passageway 74 that pass through boss 72 define a single tubular passageway extending through all the bosses 66 and 72.

The passageways 70 and 74 are configured to receive and support two air assist passageway pins 76 and 78 that are inserted into the mold cavity. Pins 76 and 78 are preferably circular and meet in the middle, one of the pins having a recess 80 and the other having a protrusion 82 that, when properly abutted and mated, cause the pins to collectively define a continuous cylindrical body. The protrusion and recess keep their respective pins in alignment during the injection molding process to thereby form a continuous air asssist passageway extending through all the injector pockets. Pins 76 and 78 collectively define the interior surface of the air assist passageway extending between the fuel injector pockets, as shown in FIGS. 1–13.

When a manifold is formed for an engine having two banks of cylinders, there will be two sets of fuel injector pocket bosses arranged as described above, each of the sets having its two associated air assist passageway pins. The number of fuel injector pocket bosses will vary with the number of cylinders in the engine.

In operation, first mold portion 62 and second mold portion 64 are closed to define a mold cavity. This cavity defines the outer surface of an intake manifold with integral air assist passageway and fuel injector pockets, or an assist air rail if it is to be formed separately. Once closed, air assist passageway pins 76 and 78 are inserted into the mold cavity and through the injector pocket bosses that extend inwardly into the mold cavity from second mold portion. The pins are inserted through the bosses passageways until they abut each other, engaging their mating protrusions and recesses. As shown in FIG. 14, at least a portion of the length of each pin 76, 78 is completely surrounded by the fuel injector pockets through which it passes. This provides 360 degree support for the pins and reduces the chance that they will be forced away from the pocket bosses when the mold cavity is filled, as they might be if they merely touched the sides of the pocket bosses or fitted into a shallow indentation in the sides of the pocket bosses. The mold is then filled with a material such as plastic, preferably mineral reinforced, and allowed to cool. The pins are then withdrawn from the mold cavity and the cavity is opened. Once the cavity is opened, the manifold or air assist rail can be removed and the air assist port can be drilled or milled if it was not formed as a part of the molding process. The two open ends of each air assist passageway defined by the pins are then plugged to prevent assist air from leaking out in use.

The manifolds and air assist rails are preferably made from plastic, more preferably a mineral fiber reinforced plastic to provide dimensional stability and strength in the hot under-hood environments experienced by contemporary internal combustion engines. Traditionally, intake manifolds have been made of light metals, such as aluminum or magnesium alloys, which would be satisfactory in the present application but are not preferred due to their weight.

The flexible seals, while shown herein as O-rings, can be rectangular, oval or lobed seals depending upon the preferred degree of sealing.

Thus, it should be apparent that there has been provided in accordance with the present invention a center feed of air for air assist fuel injector that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An intake system for an internal combustion engine having at least one bank of cylinders adjacent to each other, the system comprising:

a first plurality of air induction passageways coupable to the at least one bank of cylinders;

a first plurality of fuel injector pockets, each fluidly coupled with one of the first plurality of air induction passageways; and a first air assist passageway fluidly coupled with the first plurality of fuel injector pockets to communicate assist air to each of the fuel injector pockets at all times during operation of the internal combustion engine, wherein the first air assist passageway has a first assist air feed port for receiving assist air and the first assist air port is disposed between at least two of the first plurality of fuel injector pockets.

2. The intake system of claim 1, wherein the air intake system further comprises:

a second plurality of air induction passageways couplable to at least another bank of cylinders of the internal combustion engine;

a second plurality of fuel injector pockets, each fluidly coupled with one of the second plurality of air induction passageways; and a second air assist passageway fluidly coupled with the first plurality of fuel injector pockets to communicate assist air to each of the fuel injector pockets, wherein the air assist passageway has a second assist air feed port for receiving assist air and the second assist air port is disposed between at least two of the second plurality of fuel injector pockets.

3. The intake system of claim 2, wherein the first and second pluralities of air induction passageways each include at least three passageways, each of the at least three passageways being couplable to a corresponding cylinder of the first and second banks of cylinders, respectively.

4. The intake system of claim 3, wherein the first and second pluralities of air induction passageways each include at least four passageways, each of the at least four passageways being couplable to a corresponding cylinder of the first and second banks of cylinders, respectively.

5. The intake system of claim 1, wherein the first plurality of air induction passageways include at least four passageways, each of the at least four passageways being couplable to a corresponding cylinder of the first bank of cylinders.

6. The intake system of claim 1, wherein the first plurality of injector pockets, the first plurality of air induction passageways, the first air assist passageway and the first assist air feed port are formed as an intake manifold.

7. The air intake system of claim 6, wherein the first plurality of injector pockets, the first plurality of air induction passageways, the first air assist passageway and the first assist air feed port are injection molded in an integral form.

8. An intake system for an internal combustion engine having at least one bank of cylinders adjacent to each other, the system comprising:

a first plurality of air induction passageways couplable to the at least one bank of cylinders;

a first plurality of fuel injector pockets, each fluidly coupled with one of the first plurality of air induction passageways; and a first air assist passageway fluidly coupled with the first plurality of fuel injector pockets to communicate assist air at a pressure greater than atmospheric pressure to each of the fuel injector pockets at all times during operation of the internal combustion engine, wherein each of the first plurality of fuel injector pockets has a central longitudinal axis, and further wherein the first air assist passageway intersects each of the central axes of the plurality of fuel injector pockets.

9. The intake system of claim 8, wherein the first air assist passageway has a longitudinal axis, and wherein the first longitudinal axis of the first air assist passageway substantially intersects the first longitudinal axes of the first plurality of fuel injector pockets.

10. The intake system of claim 8, wherein the first air assist passageway intersects the plurality of fuel injector pockets between two circumferential seats on each of the plurality of fuel injector pockets, and further wherein the two circumferential seats are engageable with two flexible seals disposable between the two circumferential seats and a fuel injector.

11. The intake system of claim 10, wherein the two flexible seals are O-rings.

12. The intake system of claim 11, wherein the intake system further includes a plenum and a plurality of induction air passageways having a plurality of inlets disposed in the plenum and a plurality of outlets, each said outlet disposed adjacent to a corresponding one of the plurality of fuel injector pockets.

13. The intake system of claim 12, wherein the intake system is integrally molded.

14. An intake system for an internal combustion engine having at least one bank of cylinders adjacent to each other, the system comprising:

a first plurality of fuel injector pockets; and a first air assist passageway fluidly coupled between and integrally formed with each of the first plurality of fuel injector pockets; and an air assist port disposed in the air assist passageway to receive and transmit the assist air at a pressure greater than atmospheric pressure to the injector pockets at all times during the operation of the internal combustion engine, wherein each of the first plurality of fuel injector pockets has a central longitudinal axis, and further wherein the first air assist passageway intersects each of the central axes of the plurality of fuel injector pockets.

15. The air intake system of claim 14 wherein the air assist port is disposed between equal numbers of fuel injector pockets.

16. The air intake system of claim 15 wherein the longitudinal axis of the air assist passageway has a longitudinal axis, and further wherein the air assist passageway's longitudinal axis substantially intersects the longitudinal axes of the plurality of fuel injector pockets.

17. The air intake system of claim 16 wherein the air assist passageway and the fuel injector pockets are integrally formed as an air intake rail.

18. The air intake system of claim 17 wherein the fuel rail is injection molded from a mineral-filled plastic.

19. An intake system for an internal combustion engine having at least one bank of cylinders adjacent to each other, the system comprising:

a first plurality of air induction passageways coupable to the at least one bank of cylinders;

a first plurality of fuel injector pockets, each fluidly coupled with one of the first plurality of air induction passageways;

a substantially linear first air assist passageway extending across the at least one bank of cylinders and fluidly coupled with the first plurality of fuel injector pockets to communicate assist air to each of the fuel injector pockets, wherein the first air assist passageway has a first assist air feed port for receiving assist air and the first assist air port is disposed between at least two of the first plurality of fuel injector pockets.

20. The intake system of claim 19, wherein said first air assist passageway is open to all of the fuel injector pockets at all times during operation of the internal combustion engine.

21. The intake system of claim 19, wherein said first air assist passageway is a straight pipe extending across said one bank of cylinders.

* * * * *